United States Patent
Black

[11] 3,894,776
[45] July 15, 1975

[54] WHEEL CONSTRUCTION

[75] Inventor: John W. Black, Hickory Corners, Mich.

[73] Assignee: Pemco-Kalamazoo, Inc., Kalamazoo, Mich.

[22] Filed: Apr. 16, 1973

[21] Appl. No.: 351,792

[52] U.S. Cl. .................... 301/63 DD; 301/63 PW
[51] Int. Cl. .................... B60b 3/08; B60b 5/02
[58] Field of Search ..... 301/63 DD, 63 PW, 63 DT, 301/63 DS, 64 SH, 63 R

[56] References Cited
UNITED STATES PATENTS

| | | | |
|---|---|---|---|
| 2,338,294 | 1/1944 | Maule | 301/63 DD |
| 2,692,801 | 10/1954 | Rosenberg | 301/63 DD |
| 2,921,344 | 1/1960 | Carrico | 301/63 DD |
| 3,020,091 | 2/1962 | Solomon | 301/63 DD |
| 3,235,312 | 2/1966 | Hollander | 301/63 R |
| 3,387,894 | 6/1968 | Louik | 301/63 PW |

FOREIGN PATENTS OR APPLICATIONS

| | | | |
|---|---|---|---|
| 1,033,377 | 6/1966 | United Kingdom | 301/63 PW |

*Primary Examiner*—M. Henson Wood, Jr.
*Assistant Examiner*—Reinhard J. Eisenzopf
*Attorney, Agent, or Firm*—Woodhams, Blanchard and Flynn

[57] ABSTRACT

A wheel construction and method for making same. The wheel construction has a pair of substantially identical hub halves separated along a common radial plane and, if desired, means for securing the hub halves together. Annular, moldable, synthetic resin tread means being bonded to the hub halves to prevent relative movement between the hub halves as well as between the tread and the hub halves.

12 Claims, 5 Drawing Figures

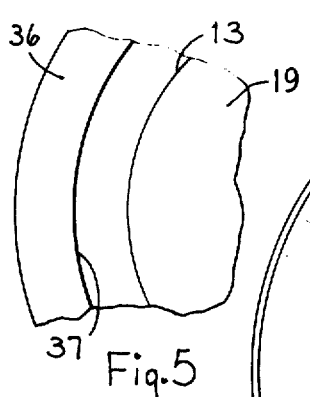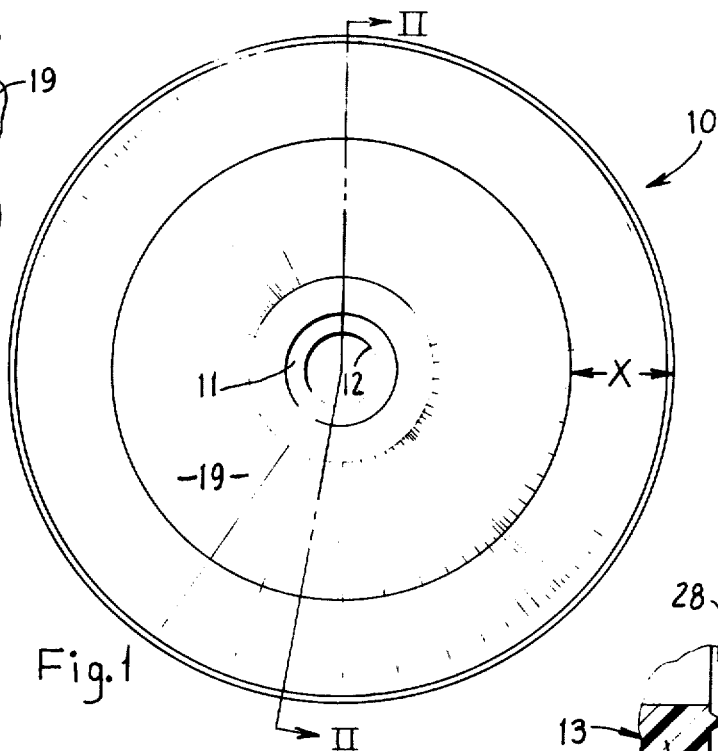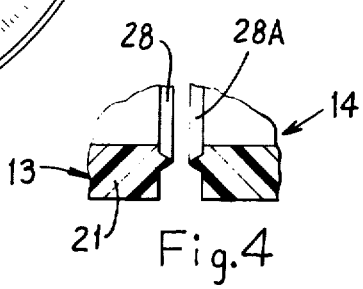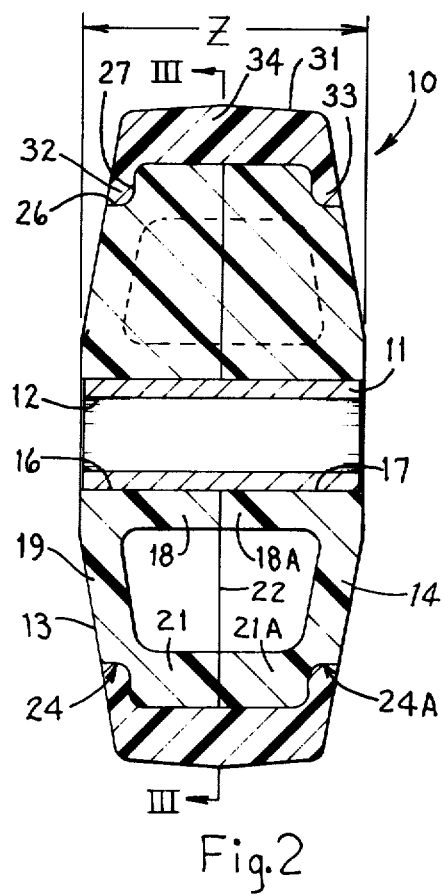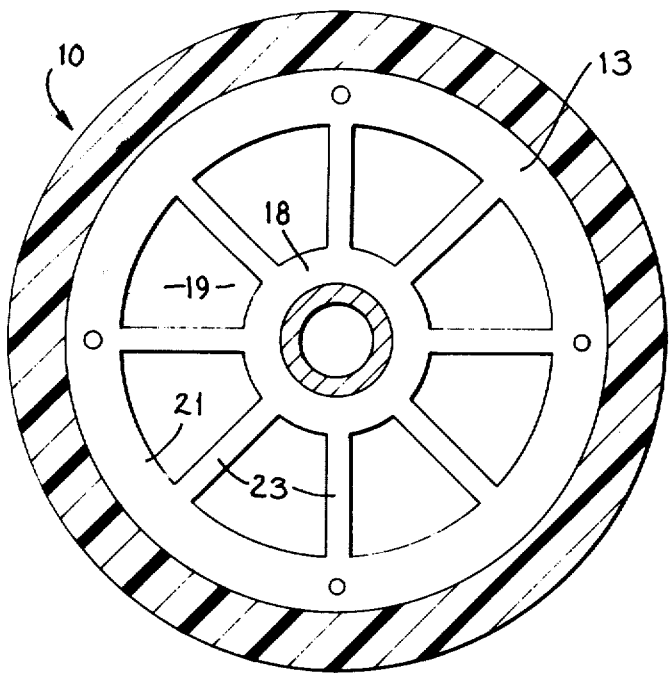

WHEEL CONSTRUCTION

BACKGROUND OF THE INVENTION

This invention relates to a wheel construction, the components of which are made of moldable, synthetic resin and to a method for making said wheel construction.

It is known that wheels can be and are presently constructed from materials designed to fit a given need and/or environment. As a result, wheels having special constructions have been produced for use on tiles and on carpet, for example. That is, a soft wheel tread is available for use on tile to prevent scratching of its surface. Also, a soft, resilient tread will cause the wheel to maintain its traction during a rolling engagement with the floor to improve control in the movement of the vehicle on which the wheels have been placed.

On the other hand, wheels having a harder tread surface are generally preferred for use on carpet, because they improve the maneuverability of the wheels, as compared to a soft tread. That is, the drag between a soft wheel and the carpet is generally more than the drag of a hard wheel moving over a carpeted surface. Also, the hard tread wheel will not leave marks on the carpeting.

There are numerous other needs for special wheels to fit given conditions and this results in excessive inventory demands upon wheel manufacturers and wheel users. Therefore, and in an effort to improve upon known wheels and to reduce inventory requirements, Applicant has developed a wheel construction which is capable of use on both hard and soft surfaces such as tile and carpeted surfaces, respectively.

Heretofore, in wheels having a rigid hub and an attachable annular tread, the opening in the tread is frequently larger in diameter than the outer diameter of the hub structure. The tread is sleeved upon the hub structure and is then compressed radially inwardly and secured by an adhesive, for example, to the hub structure. Often the tread does not compress evenly, the periphery of the tread will be eccentric and, therefore, will cause a bouncing motion as the wheel rolls along a surface.

In wheels having a solid hub and a resilient tread, the tread is stretched and then sleeved on the hub, but the tread does not always return to a concentric condition.

Some wheels having a hard core and soft tread are molded, but the core does not develop a uniform circular periphery during the molding operation. Thus, since the core and tread are usually of different densities, the wheel is out of balance.

It is also known that wheels for certain uses, as on grocery carts, must withstand massive overloads, as when the cart is rammed into a curb. Moreover, grocery cart wheels are often exposed to dust, snow, water, mud and a variety of other contaminants which will cling to any external disfiguration on the wheel. These foreign materials tend to increase wear and can lodge themselves so as to prevent rotation of the wheel.

Accordingly, it is an object of this invention to provide a wheel construction which is capable of use on either normally hard surfaces, such as tile or cement, or normally soft surfaces, such as carpeting, which is extremely durable under massive loads and capable of long useful wear.

Another object of this invention is to provide a wheel construction wherein the tread is concentrically secured to the hub, wherein the hub parts and tread are positively held against relative movement, and wherein the component parts of the wheel are formed from a moldable, synthetic and inexpensive resin.

Another object of this invention is to provide a tread which rolls quietly on hard surfaces, which incurs a minimum of drag on soft surfaces, such as carpeting, and which does not mark hard or soft surfaces.

Another object of this invention is to provide a wheel construction having a smooth outer surface devoid of disfigurations capable of collecting foreign materials.

Another object of this invention is to provide a hollow hub construction having a plurality of separate, internal webs to strengthen the wheel while presenting a smooth outer surface which minimizes the collection dust and dirt thereon.

Other objects and purposes of this invention will be apparent to persons acquainted with apparatus of this general type upon reading the following specification and inspecting the accompanying drawing, in which:

FIG. 1 is a side view of a wheel embodying the invention;

FIG. 2 is a sectional view taken along the line II—II of FIG. 1;

FIG. 3 is a sectional view taken along the line III—III of FIG. 2; and

FIG. 4 is a fragment of the FIG. 2 showing the pair of hub halves prior to securement together;

FIG. 5 is a fragment of a mold with a hub structure therein.

The words "in" and "out," as used herein, will refer to directions toward and away from the geometric center of the device.

SUMMARY OF THE INVENTION

The objects and purposes of the invention are met by providing a wheel construction comprising a pair of hub halves separated along a common radial plane and including means for securing the hub halves together. An annular, moldable, synthetic resin tread is molded on the periphery of the hub halves and is bonded to the hub halves to prevent a relative movement between the tread and the hub halves, and to strengthen the wheel.

The objects and purposes of the invention are also met by providing a method for making the wheel wherein a pair of hub halves are placed side-by-side in a mold having an annular cavity of uniform depth around the periphery of the hub halves. A moldable, synthetic resin is injected into the mold cavity around the hub halves so that the resin forms a concentric tread firmly secured to the hub halves.

DETAILED DESCRIPTION

A wheel assembly 10 is illustrated in FIG. 1 and comprises an axle 11 which may consist of a metallic tubular member having a coaxial opening 12 therethrough.

A pair of hub halves 13 and 14 are each composed of a sturdy, moldable synthetic resin, such as ABS (acrylonitrile-butadienestyrene). The hub halves 13 and 14 have central, axially aligned openings 16 and 17, respectively, into which the axle 11 is snugly received to prevent relative axial movement therebetween. In this embodiment, the hub halves are identical and, as a result, only the hub half 13 will be described in detail, it being understood that the hub half 14 is identical thereto.

The axle 11 is preferably shorter than the adjacent axial dimension of the combined hub halves 13 and 14. Thus, the hub halves engage the supported structure, such as a caster yoke, and provide noise isolation.

The hub half 13 has a generally cylindrical sleeve 18 which defines said central opening 16. A wall 19 (FIG. 2) is integral with and extends outwardly from the sleeve 18 adjacent the left side thereof. An annular peripheral wall 21 is integral with the radially outer edge of the radial wall 19 and is concentric with the sleeve 18. The right ends of the sleeve 18 and the peripheral wall 21 terminate in a common radial plane illustrated by the line 22. Plural radial webs 23 are integral with and extend between the sleeve 18 and the peripheral wall 21 (FIG. 3).

The leftward edge of the peripheral wall 21 has an annular groove 24 (FIG. 2) which opens both axially and radially. That is, the groove 24 has a radial wall 26 and an axial wall 27 disposed generally at right angle to each other.

Most of the outer axial face of the radial wall 19 is, in this particular embodiment, inclined to said radial plane 22.

The rightwardly facing edge of peripheral wall 21 has an axially extending, annular ridge 28. If desired, the right edge of the peripheral wall 21 may be roughened for a purpose which will become apparent hereinafter. Moreover, the right edge of the sleeve 18 may also be provided with an annular ridge (not illustrated) similar to the ridge 26 on the right edge of the peripheral wall 21. The height of the extents of the ridges are generally equal.

The hub halves 13 and 14, can be secured to each other or they can be free to move relative to each other until the tread 31 is secured to said hub halves.

The hub halves may be secured together by any convenient means, such as an adhesive. In this particular embodiment, the hub halves are fabricated from a material which, when sufficiently heated flows and forms an adhesive capable of a strong bond to itself when it cools and sets. Thus, if the hub halves are rotated relative to one another when their ridges 28 and 28A are in engagement, the heat generated by friction will soften the ridges. Thus, when the rotation stops, the opposing edges of the peripheral walls 21 and 21A will be firmly held together as soon as they cool. An important part of this operation is the termination of the rotation so that the total axial thickness of the welded hub halves is within acceptable limits from a predefined amount Z (FIG. 2).

An annular tread 31, which is preferably made of a moldable, synthetic resin, such as polyurethane, encircles the periphery of a pair of side-by-side hub halves 13 and 14. The tread 31 is a curved, endless channel having a U-shaped cross section defined by a pair of flanges 32 and 33 and a web 34. The flanges 32 and 33 are received into the annular grooves 24 and 24A and serve to hold the hub halves 13 and 14 together in the event that the hub halves are not secured together by adhesive means. The flanges 32 and 33 also create the optical illusion of a deeper tread indicated by X in FIG. 1.

Generally, the polyurethane material of the tread 31 is a durable material having excellent wear characteristics so as to minimize the necessity for wheel replacement. As a result, the thickness of the tread 31 can be much less than that on conventional rubber tires, without sacrificing useful life.

The method for making the above-described wheel construction is discussed in the following paragraphs.

Where the hub halves 13 and 14 are not secured together by an adhesive, the hub halves are placed side-by-side so that the axial edges of the sleeves 18 and 18A and the peripheral walls 21 and 21A are in abutting relationship along the plane 22. Such hub halves will not normally have ridges 28 and 28A or similar ridges on the sleeves 18 and 18A.

The hub halves 13 and 14 are then placed into the center of a mold 36 such that when the mold halves are closed, a concentric annular cavity 37 surrounds the peripheries of the hub halves. The radially inner portion of the cavity is defined by the outer surfaces of the peripheral walls 21 and 21A of the hub halves 13 and 14.

A sufficient quantity of moldable synthetic resin is injected into the mold cavity to completely fill the mold cavity including the grooves 24 and 24A. The tread depth is uniform and perfectly concentric with the hub halves. The tread material is cooled or permitted to cool and the completed wheel is thereafter removed from the mold. The parting line between the mold halves is, preferably coplanar with the plane 22. If the molding operation produces a flashing or sprue, it can be trimmed by cutting or by heat.

If the hub halves are attached to each other before the tread is applied, such attachment can be accomplished by applying an independent adhesive to the opposing edges of the sleeves 18, 18A and walls 21, 21A or by the spinning operation discussed above.

The hub halves are then placed into the mold 36, as described above, and the tread material is injected into the mold. After cooling, the finished wheel is removed.

The dimension Z must be closely controlled to prevent the seepage of tread material between the axially facing surfaces of the wheel and the inner surfaces of the mold.

A bond is formed between the polyurethane tread material and the ABS material so that the tread will not roll off the periphery of the hub defined by the hub halves 13 and 14. Further, where the hub halves 13 and 14 are not secured together, the bond between the tread and hubs will further strengthen the wheel construction.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A wheel construction, comprising:
   hollow, moldable hub means made of acrylonitrile-butadienestyrene and having an axially extending cylindrical sleeve portion with a central opening therethrough, cylindrical peripheral wall means concentric with said sleeve portion and spaced radially outwardly therefrom, a pair of axially spaced and generally radially extending side wall means for connecting the corresponding axial ends of said sleeve portion and said peripheral wall means, and means defining annular grooves at the opposite ends of said peripheral wall means, each of said grooves opening both radially and axially; and moldable tread means made of polyurethane and defining an endless channel having a pair of flanges and a web portion, said flanges being received into said annular grooves and said web portion engaging said peripheral wall means, said tread means being concentric with said peripheral wall means, said hub means and said tread means having a face-to-face mutually adhering bond therebetween, said bond formed by applying said polyurethane to said hub in a molten state.

2. A wheel construction according to claim 1, wherein said side wall means have outer axial surfaces converging radially outwardly; and wherein the axially facing outer surfaces of said flanges form extensions of and are flush with said axial surfaces of said side wall means.

3. A wheel construction according to claim 2, including cylindrical axle means snugly disposed in said central opening in said cylindrical sleeve portion.

4. A wheel construction according to claim 1, wherein said hollow hub means comprises a pair of identical hub halves disposed in reflecting positions on opposite sides of a dividing radial plane; and wherein said face-to-face mutually adhering bond between said hub halves and said tread means also holds said hub halves together.

5. A wheel construction according to claim 4, wherein said flanges of said tread means are received into said axially spaced groove means and thereby hold said hub halves together.

6. A wheel construction according to claim 4, including means securing said hub halves together independent of said face-to-face bond between said hub halves and said tread means.

7. A wheel construction, comprising:

hub means having a pair of identical halves made of an acrylonitrile-butadiene-styrene material, each half consisting of a cylindrical sleeve portion with a central opening therethrough, a radially outwardly extending wall integral with said sleeve adjacent one end thereof, a cylindrical peripheral wall concentric with said sleeve portion and integral at one end with the radially outer edge of said radial wall and a plurality of radial webs secured to said radial wall and secured to and extending between said sleeve portion and said peripheral wall, the edges of said sleeve portion, said peripheral wall and said radial webs remote from said radial wall terminating in a plane perpendicular to the axis of said central opening, said hub halves being disposed in reflecting positions on opposite sides of said plane; and tread means made of a moldable polyurethane material and defining an endless channel having a pair of flanges and a web, said flanges snugly engaging the remote axial ends of said peripheral walls of said hub halves, said tread means and said hub means having a face-to-face mutually adhering bond therebetween, said bond formed by applying said polyurethane to said hub in a molten state, whereby to hold said hub halves together and said web snugly engaging said peripheral walls.

8. A wheel construction, comprising:

a pair of identical hub halves engaged along a common radial plane and including means for securing said hub halves together, said hub halves being made of an acrylonitrile-butadiene-styrene material;

moldable tread means made of polyurethane material molded around the periphery of said hub halves, said tread means and said hub means having a face-to-face mutually adhering bond therebetween, said bond formed by applying said polyurethane to said hub in a molten state, the axially facing surfaces of said hub halves and said tread means being smooth and unbroken.

9. In a method for making a wheel, the steps comprising:

placing a pair of separate and coaxial hub halves made of acrylonitrile-butadiene-styrene material side-by-side into a mold having an annular cavity of uniform thickness around the periphery of said hub halves, the radially inner wall of said cavity being defined at least in part by the portion of said hub halves adjacent the periphery thereof; and injecting a moldable polyurethane material in a molten state into said mold cavity around the periphery of said hub halves, said moldable polyurethane forming a face-to-face mutually adhering bond with said hub halves to form a tread for said wheel construction concentric with said hub halves.

10. A method according to claim 9, including the step of securing said hub halves together prior to placing same into said mold.

11. A method according to claim 10, wherein said step of securing said hub halves together consists of spin welding said hub halves.

12. A method according to claim 11, including the step of controlling said spin welding to maintain the axial thickness of said hub halves within specified limits of a selected value.

* * * * *